(12) United States Patent
Lin et al.

(10) Patent No.: US 11,333,963 B2
(45) Date of Patent: May 17, 2022

(54) ILLUMINATION SYSTEM AND PROJECTION DEVICE

(71) Applicant: Coretronic Corporation, Hsin-Chu (TW)

(72) Inventors: Chun-Wei Lin, Hsin-Chu (TW); Chin-Wen Huang, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/232,136

(22) Filed: Apr. 15, 2021

(65) Prior Publication Data
US 2021/0341824 A1    Nov. 4, 2021

(30) Foreign Application Priority Data
Apr. 30, 2020    (CN) .................. 202010361226.X

(51) Int. Cl.
*G03B 21/20* (2006.01)
(52) U.S. Cl.
CPC ....... *G03B 21/208* (2013.01); *G03B 21/2073* (2013.01); *G03B 21/2013* (2013.01); *G03B 21/2033* (2013.01)
(58) Field of Classification Search
CPC ............ G03B 21/2073; G03B 21/2013; G03B 21/2033; G03B 21/208
USPC .......................................................... 353/20
See application file for complete search history.

(56) References Cited

U.S. PATENT DOCUMENTS

| | | |
|---|---|---|
| 7,980,706 B2 | 7/2011 | Wang |
| 9,004,699 B2 | 4/2015 | Huang |
| 2005/0117337 A1 | 6/2005 | Ishii et al. |

(Continued)

FOREIGN PATENT DOCUMENTS

| | | |
|---|---|---|
| CN | 1467534 | 1/2004 |
| CN | 1624575 | 6/2005 |

(Continued)

OTHER PUBLICATIONS

"Search Report of Europe Related Application, application No. 20217548.5", dated Jun. 23, 2021, p. 1-p. 9.

(Continued)

*Primary Examiner* — Jerry L Brooks
(74) *Attorney, Agent, or Firm* — JCIPRNET

(57) ABSTRACT

An illumination system and a projection device are provided. The illumination system includes a light source device, a light homogenizing element, and a polarization element. The light source device is configured to provide first, second, third, and first compensation beams. The light homogenizing element is disposed on transmission paths of the first, second, and third beams and the first compensation beam and is configured to convert the first, second, and third beams and the first compensation beam into an illumination beam. The polarization element is disposed on the transmission paths of the first beam and the first compensation beam and located between the light source device and the light homogenizing element. The first beam and the first compensation beam pass through the polarization element to change polarization states of the first beam and the first compensation beam to be the same as polarization states of the second and third beams.

20 Claims, 4 Drawing Sheets

(56) References Cited

U.S. PATENT DOCUMENTS

| | | | |
|---|---|---|---|
| 2008/0094577 A1* | 4/2008 | Krijn | G03B 21/2033 353/20 |
| 2008/0192205 A1* | 8/2008 | De Vaan | G02F 1/13362 353/20 |
| 2009/0262309 A1 | 10/2009 | Yamauchi | |
| 2011/0007279 A1 | 1/2011 | Silverstein et al. | |
| 2012/0133904 A1 | 5/2012 | Akiyama | |
| 2014/0354956 A1 | 12/2014 | Yamada et al. | |
| 2016/0139419 A1 | 5/2016 | Huang | |
| 2016/0286180 A1* | 9/2016 | Otani | G03B 21/005 |
| 2017/0176845 A1 | 6/2017 | Ogino | |
| 2019/0310539 A1 | 10/2019 | Yamagishi et al. | |
| 2021/0191250 A1 | 6/2021 | Kurita et al. | |

FOREIGN PATENT DOCUMENTS

| | | |
|---|---|---|
| CN | 102854622 | 1/2013 |
| CN | 104791717 | 7/2015 |
| CN | 204595412 | 8/2015 |
| CN | 104020632 | 8/2016 |
| CN | 104614867 | 1/2017 |
| CN | 106997142 | 8/2017 |
| CN | 107885021 | 4/2018 |
| CN | 108225182 | 6/2018 |
| CN | 108614385 | 10/2018 |
| CN | 208060924 | 11/2018 |
| CN | 109557750 | 4/2019 |
| CN | 209265161 | 8/2019 |
| CN | 210038427 | 2/2020 |
| CN | 211403092 | 9/2020 |
| CN | 113391506 | 9/2021 |
| EP | 3521749 | 8/2019 |
| JP | 2012533087 | 12/2012 |
| KR | 20150097098 | 8/2015 |
| TW | 201516555 | 5/2015 |
| TW | 201541181 | 11/2015 |
| WO | 2011146267 | 11/2011 |
| WO | 2018196195 | 11/2018 |

OTHER PUBLICATIONS

"Search Report of Europe Counterpart Application", dated Jul. 23, 2021, p. 1-p. 7.

"Office Action of U.S. Appl. No. 17/131,793", dated Dec. 8, 2021, pp. 1-27.

"Office Action of China Related Application, Application No. 202010170060.3", dated Jan. 28, 2022, p. 1-p. 9.

* cited by examiner

ILLUMINATION SYSTEM AND PROJECTION DEVICE

CROSS-REFERENCE TO RELATED APPLICATION

This application claims the priority benefit of China patent application serial no. 202010361226.X, filed on Apr. 30, 2020. The entirety of the above-mentioned patent application is hereby incorporated by reference herein and made a part of this specification.

BACKGROUND OF THE INVENTION

Field of the Invention

The invention relates to an optical system and an electronic device, and in particular, to an illumination system and a projection device.

Description of Related Art

A projection device is a display device configured to generate large size images. With the evolution and innovation of science and technology, the projection device has been continuously improved. An imaging principle of the projection device is to convert an illumination beam generated by an illumination system into an image beam via a light valve, and then the image beam is projected onto a projection target object (for example, a screen or a wall surface) through a projection lens, to form a projected image.

In addition, the illumination system also evolves from an ultra-high-performance (UHP) lamp and a light-emitting diode (LED) to the most advanced laser diode (LD) light source in response to the market requirements of the projection device for brightness, color saturation, service life, being non-toxic, and environmental protection. In an existing optical system, a plurality of different LDs may be further modularized into a multi-chip laser (MCL) module. Therefore, a volume of the optical system of a projector may be further reduced. However, since a transmittance in an S polarization direction cannot be consistent with a transmittance in a P polarization direction by applying the conventional coating process, the transmittance is higher in one of the polarization directions and lower in the other direction, which may result in lower brightness of red, blue, or green light in different polarization states in the MCL module. Therefore, in the existing optical system adopting the MCL module, one of the red light, the blue light, and the green light may have low brightness and poor color uniformity.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be solved by one or more embodiments of the invention were acknowledged by people of ordinary skill in the pertinent art.

SUMMARY OF THE INVENTION

The invention provides an illumination system and a projection device, which may improve color uniformity.

Other objectives and advantages of the invention may further be learned from technical features disclosed in the invention.

In order to achieve one or a part or all of the foregoing objectives or other objectives, the invention provides an illumination system including a light source device, a light homogenizing element, and a polarization element. The light source device is configured to provide a first beam, a second beam, a third beam, and a first compensation beam. The light homogenizing element is disposed on transmission paths of the first beam, the second beam, the third beam, and the first compensation beam and configured to convert the first beam, the second beam, the third beam, and the first compensation beam into an illumination beam. The polarization element is disposed on the transmission paths of the first beam and the first compensation beam and located between the light source device and the light homogenizing element. The first beam and the first compensation beam pass through the polarization element to change polarization states of the first beam and the first compensation beam to be the same as polarization states of the second beam and the third beam.

In order to achieve one or a part or all of the foregoing objectives or other objectives, the invention further provides a projection device, including an illumination system, at least one light valve, and a projection lens. The illumination system is configured to provide an illumination beam. The illumination system includes a light source device, a light homogenizing element, and a polarization element. The light source device is configured to provide a first beam, a second beam, a third beam, and a first compensation beam. The light homogenizing element is disposed on transmission paths of the first beam, the second beam, the third beam, and the first compensation beam and configured to convert the first beam, the second beam, the third beam, and the first compensation beam into the illumination beam. The polarization element is disposed on the transmission paths of the first beam and the first compensation beam and located between the light source device and the light homogenizing element. The light valve is disposed on a transmission path of the illumination beam and configured to convert the illumination beam into an image beam. The projection lens is disposed on a transmission path of the image beam and configured to project the image beam out of the projection device. The first beam and the first compensation beam pass through the polarization element to change polarization states of the first beam and the first compensation beam to be the same as polarization states of the second beam and the third beam.

Based on the foregoing, the embodiments of the invention have at least one of the following advantages or effects. In the illumination system and the projection device provided in one or more embodiments of the invention, the light source device provides the first beam, the second beam, the third beam, and the first compensation beam, and the polarization element is disposed on the transmission paths of the first beam and the first compensation beam, so that the first beam and the first compensation beam pass through the polarization element to change the polarization states of the first beam and the first compensation beam to be the same as the polarization states of the second beam and the third beam. Therefore, the first beam, the second beam, the third beam, and the first compensation beam have the same polarization state when passing through the light homogenizing element. As such, the polarization states of all of the beams may be unified to improve the color uniformity.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
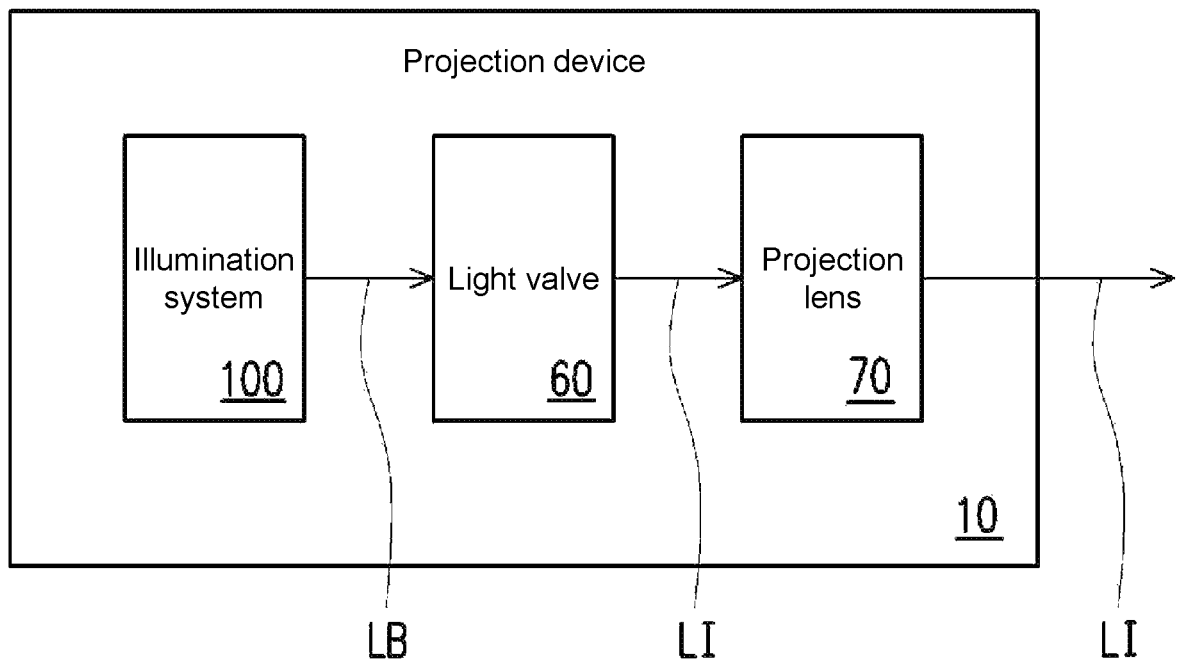
FIG. 1 is a schematic diagram of a projection device according to an embodiment of the invention.

FIG. 1 is a schematic diagram of a projection device according to an embodiment of the invention. With reference to FIG. 1, the present embodiment provides a projection device 10, including an illumination system 100, at least one light valve 60, and a projection lens 70. The illumination system 100 is configured to provide an illumination beam LB. The light valve 60 is disposed on a transmission path of the illumination beam LB, and is configured to convert the illumination beam LB into an image beam LI. The projection lens 70 is disposed on a transmission path of the image beam LI, and is configured to project the image beam LI out of the projection device 10 to a projection target (not shown), for example, a screen or a wall surface.

The light valve 60 is, for example, a reflective light modulator such as a liquid crystal on silicon (LCoS) panel, a digital micro-mirror device (DMD), and the like. In some embodiments, the light valve 60 may also be a penetrated optical modulator such as a transparent liquid crystal panel, an electro-optical modulator, a magneto-optic modulator, an acousto-optic modulator (AOM), and the like. The invention does not limit a form and a category of the light valve 60. For detailed steps and implementations of converting the illumination beam LB into the image beam LI by the light valve 60, adequate instructions, advices, and implementation descriptions may be obtained from general knowledge in the art, and the descriptions thereof are omitted. In the present embodiment, there is only one light valve 60, for example, the projection device 10 with a single digital micro-mirror element is used, but in other embodiments, there may be a plurality of light valves, and the invention is not limited thereto.

The projection lens 70 includes, for example, a combination of one or more dioptric optical lenses, for example, includes various combinations of non-planar lenses such as a biconcave lens, a biconvex lens, a meniscus lens, a convex-concave lens, a plano-convex lens, a plano-concave lens, and the like. In one embodiment, the projection lens 70 may further include a flat optical lens, which projects the image beam LI from the light valve 60 to the projection target in a reflective manner. A form and a category of the projection lens 70 are not limited in the invention.

Figure 2:
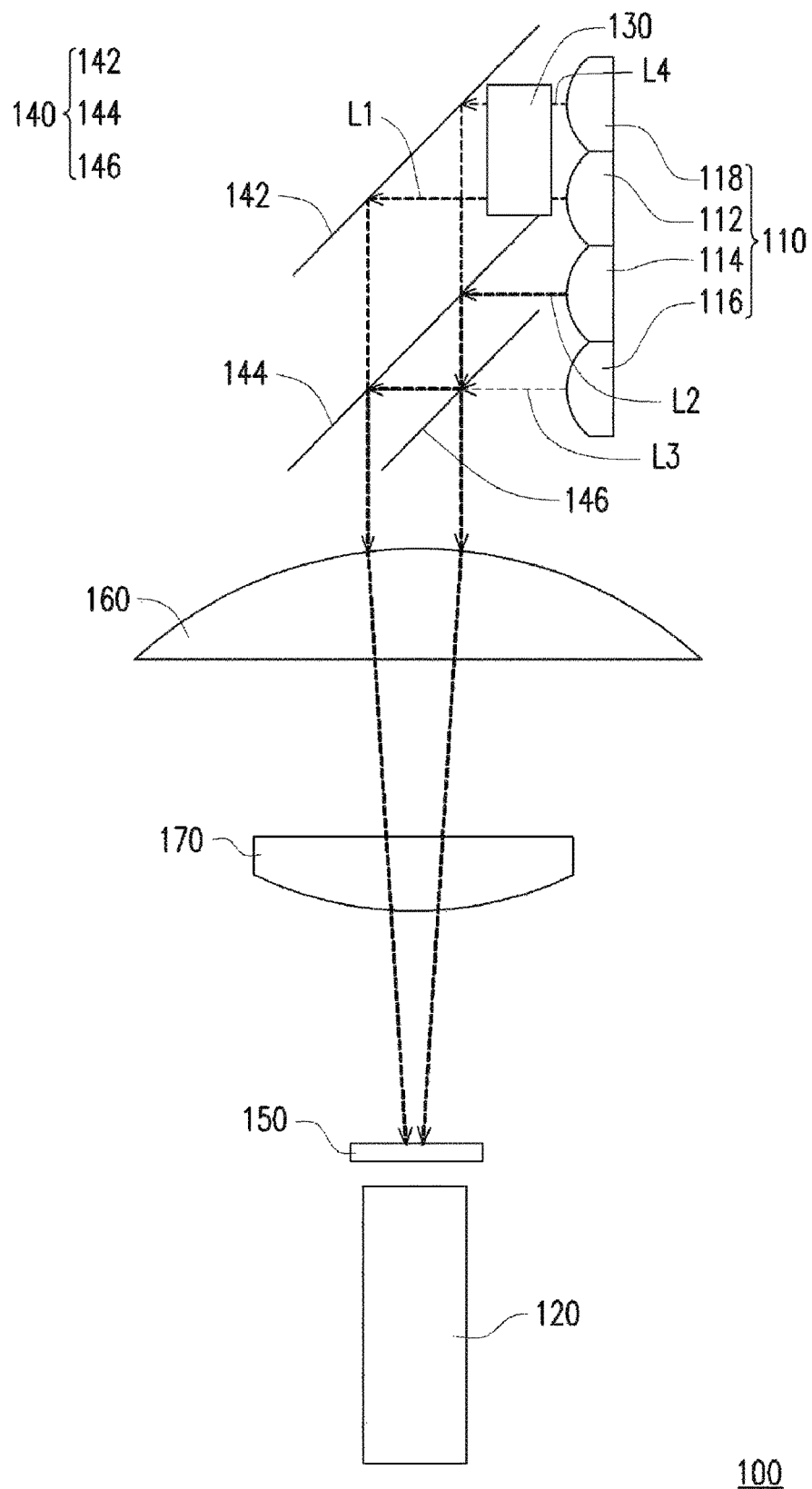
FIG. 2 is a schematic diagram of an illumination system according to an embodiment of the invention.

FIG. 2 is a schematic diagram of an illumination system according to an embodiment of the invention. Referring to FIG. 1 and FIG. 2, an illumination system 100 shown in FIG. 2 may be applied to at least the projection device 10 shown in FIG. 1. In the present embodiment, the illumination system 100 includes a light source device 110, a light homogenizing element 120, and a polarization element 130. Specifically, the illumination system 100 in present embodiment further includes a light guide device 140, a diffusion device 150, a condensing element 160, and a lens 170.

The light source device 110 is configured to provide a first beam L1, a second beam L2, a third beam L3, and a first compensation beam L4. Specifically, in the present embodiment, the light source device 110 includes a first laser light source 112, a second laser light source 114, a third laser light source 116, and a first compensation laser light source 118. The first laser light source 112 is used to provide the first beam L1, the second laser light source 114 is used to provide the second beam L2, the third laser light source 116 is used to provide the third beam L3, and the first compensation laser light source 118 is used to provide the first compensation beam L4. The first beam L1, the second beam L2, the third beam L3, and the first compensation beam L4 are transmitted and emitted by the light source device 110 in the same direction.

For example, in the present embodiment, the light source device 110 is a multi-color laser (MCL) module. The first laser light source 112 is a red laser diode, the second laser light source 114 is a blue laser diode, and the third laser light source 116 is a green laser diode, and the first compensation laser light source 118 is a red laser diode, but the invention is not limited thereto. Therefore, the first beam L1, the second beam L2, the third beam L3, and the first compensation beam L4 are red light, blue light, green light, and red light, respectively.

In the present embodiment, polarization states of the first beam L1 and the first compensation beam L4 are the same, and polarization states of the second beam L2 and the third beam L3 are the same and different from polarization states of the first beam L1 and the first compensation beam L4. For example, the polarization states of the first beam L1 and the first compensation beam L4 are both P-polarized linear polarization (or P polarization), and the polarization states of the second beam L2 and the third beam L3 are both S-polarized linear polarization (or S polarization).

The light homogenizing element 120 is disposed on transmission paths of the first beam L1, the second beam L2, the third beam L3, and the first compensation beam L4 and is configured to convert the first beam L1, the second beam L2, the third beam L3, and the first compensation beam L4 into the illumination beam LB. The light homogenizing element 120 is configured to adjust light spot shapes of the beams, so that the spot shapes of the beams can match a shape (for example, a rectangular shape) of a working area of a light valve 60, and the light spots have consistent or approximate light intensity everywhere, to achieve uniform light intensity of the beams. In the present embodiment, the light homogenizing element 120 is, for example, an integration rod, but in other embodiments, the light homogenizing element 120 may also be other appropriate type of optical elements, for example, a lens array (a fly-eye lens array), and the invention is not limited thereto.

The light guide device 140 is disposed on transmission paths of the first beam L1, the second beam L2, the third beam L3, and the first compensation beam L4, and is configured to guide the first beam L1, the second beam L2, the third beam L3, and the first compensation beam L4. In the present embodiment, the light guide device 140 includes a reflecting element 142, a light splitting element 144, and a semi-reflecting element 146. The reflecting element 142 is disposed on the transmission paths of the first beam L1 and the first compensation beam L4, and is configured to reflect the first beam L1 and the first compensation beam L4 to different transmission paths, respectively. The light splitting element 144 is disposed on the transmission path of the second beam L2. The light splitting element 144 is, for example, a dichroic mirror with blue reflection (DMB) configured to reflect the second beam L2 and allow the first beam L1 to pass. The semi-reflecting element 146 is disposed on the transmission path of the third beam L3. The semi-reflecting element 146 is, for example, a half mirror with green and blue (HMGB), and is configured to reflect a part of the second beam L2 and a part of the third beam L3, and allow another part of the second beam L2 and another part of the third beam L3 to pass. For example, 50% of the second beam L2 and 50% of the third beam L3 are reflected, and another 50% of the second beam L2 and another 50% of the third beam L3 are allowed to pass.

The diffusion device 150 is disposed on transmission paths of the second beam L2 and the third beam L3, and is configured to diffuse the second beam L2 and the third beam L3. The diffusion device 150 is, for example, a diffuser or a rotating wheel having a diffusion sheet, and the invention is not limited thereto.

The polarization element 130 is configured to change the polarization states of the beams. The polarization element 130 is disposed on the transmission paths of the first beam L1 and the first compensation beam L4, and is located between the light source device 110 and the light homogenizing element 120. Specifically, in the present embodiment, the polarization element 130 is disposed between the light source device 110 and the light guide device 140, as shown in FIG. 2. In the present embodiment, the polarization element 130 includes a half-wave plate, and is disposed only on the transmission paths of the first beam L1 and the first compensation beam L4. In other words, the second beam L2 and the third beam L3 do not pass through the polarization element 130.

Therefore, when the first beam L1 and the first compensation beam L4 pass through the polarization element 130, a P-polarized first beam L1 and a P-polarized first compensation beam L4 will be converted into an S-polarized first beam L1 and an S-polarized first compensation beam L4 through the polarization element 130. In other words, the first beam L1 and the first compensation beam L4 pass through the polarization element 130 to change polarization states of the first beam L1 and the first compensation beam L4 to be the same as the polarization states of the second beam L2 and the third beam L3. In other words, the first beam L1, the second beam L2, the third beam L3, and the first compensation beam L4 have the same polarization state (i.e., the S-polarized state) when passing through the light homogenizing element 120. As such, the polarization states of all of the beams may be unified to improve the color uniformity.

In addition, it is also worth mentioning that in the present embodiment, in comparison to the conversion of the S-polarized beam into the P-polarized beam, the conversion of the P-polarized beam into the S-polarized beam may also have an advantage. In detail, the half-wave plate in the polarization element 130 may absorb the beam to some extent. Since the main brightness in the illumination system 100 is provided by the third beam L3 as green light, if the polarization element 130 is used to convert the polarization states of the first beam L1 and the first compensation beam L4 instead of converting the polarization state of the third beam L3, which will enable the illumination system 100 to have better brightness and maintain good optical effects.

In another embodiment, the half-wave plate of the polarization element 130 may be replaced with a twisted nematic (TN) liquid crystal device, to convert the P-polarized first beam L1 and the P-polarized first compensation beam L4 into the S-polarized first beam L1 and the S-polarized first compensation beam L4, but the invention is not limited thereto.

Figure 3:
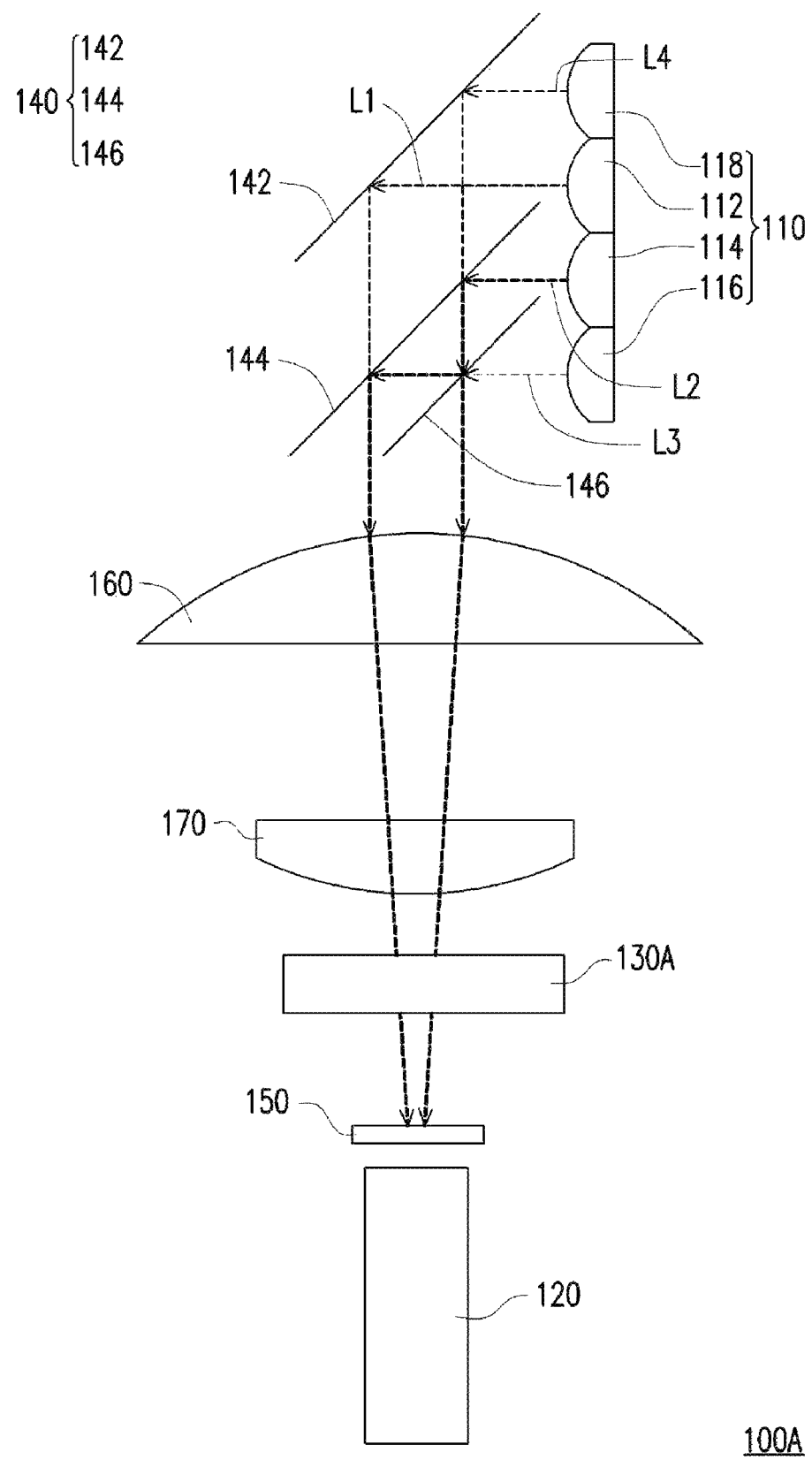
FIG. 3 is a schematic diagram of an illumination system according to another embodiment of the invention.

FIG. 3 is a schematic diagram of an illumination system according to another embodiment of the invention. Referring to FIG. 3, an illumination system 100A in the present embodiment is similar to the illumination system 100 shown in FIG. 2. A difference between the two is that in the present embodiment, a polarization element 130A includes a quarter-wave plate or a depolarizer, and is alternately disposed between a light guide device 140 and a light homogenizing element 120. Therefore, a first beam L1, a second beam L2, a third beam L3, and a first compensation beam L4 that are guided by the light guide device 140 will simultaneously pass through the polarization element 130A. In other words, the second beam L2 and the third beam L3 are caused to pass through the polarization element 130 to change polarization states thereof.

In detail, when the polarization element 130A is a quarter-wave plate, a P-polarized first beam L1, an S-polarized second beam L2, an S-polarized third beam L3, and a P-polarized first compensation beam L4 pass through the polarization element 130A to be converted into a circularly polarized first beam L1, a circularly polarized second beam L2, a circularly polarized third beam L3, and a circularly polarized first compensation beam L4. Therefore, the first beam L1, the second beam L2, the third beam L3, and the first compensation beam L4 have the same polarization state (i.e., the circular polarization state) when passing through the light homogenizing element 120. In addition, when the polarization element 130A is a depolarizer, the P-polarized first beam L1, the S-polarized second beam L2, the S-polarized third beam L3, and the P-polarized first compensation beam L4 pass through the polarization element 130A to be converted into an unpolarized first beam L1, an unpolarized second beam L2, an unpolarized third beam L3, and an unpolarized first compensation beam L4. Therefore, the first beam L1, the second beam L2, the third beam L3, and the first compensation beam L4 have the same polarization state (i.e., the unpolarized state) when passing through the light homogenizing element 120.

As such, the polarization states of all of the beams may be unified to improve the color uniformity. In another embodiment, the foregoing polarization element 130A may be a twisted nematic liquid crystal device instead of a quarter-wave plate or a depolarizer, to achieve the same effect, and the invention is not limited thereto.

Figure 4:
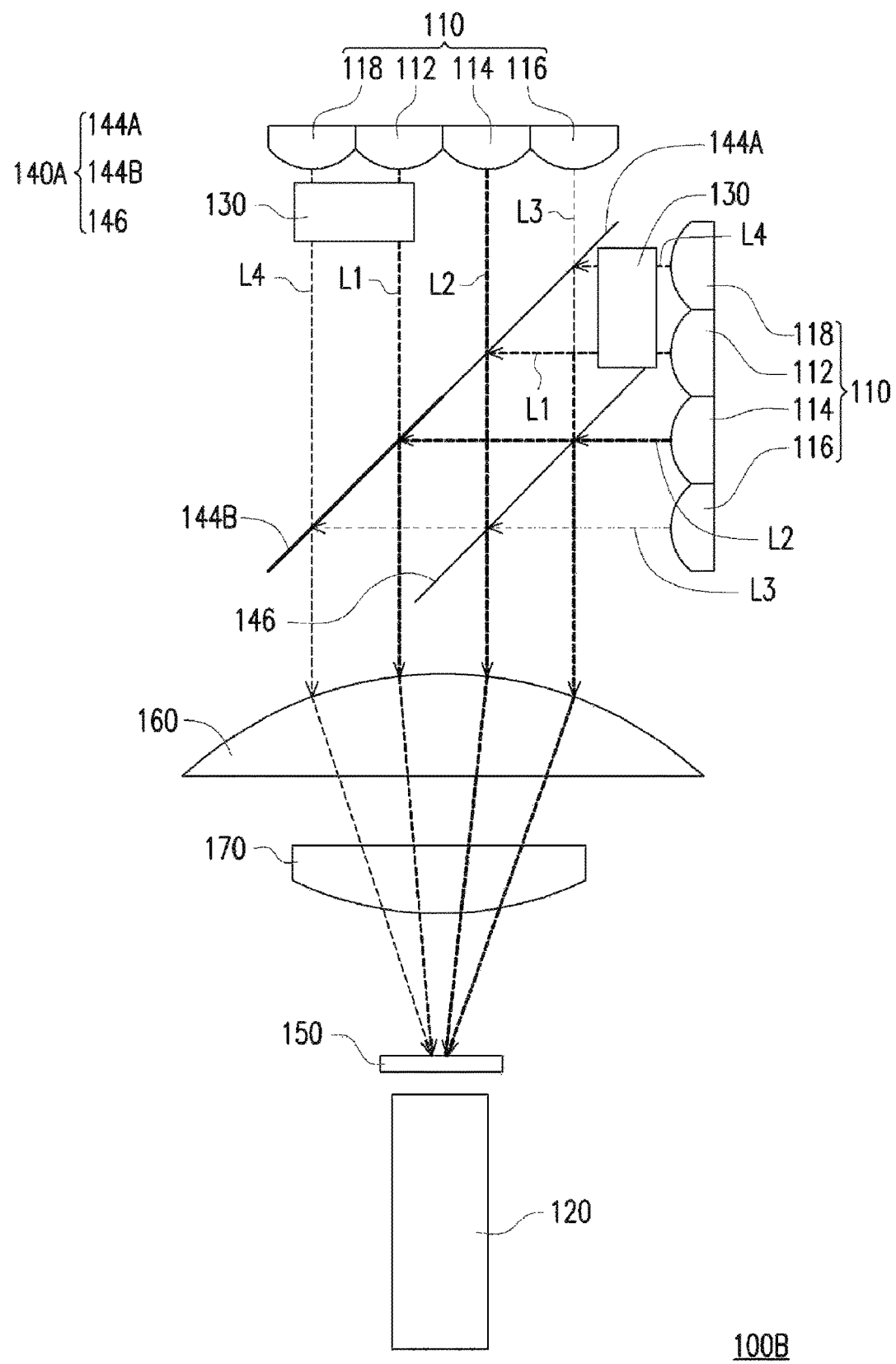
FIG. 4 is a schematic diagram of an illumination system according to another embodiment of the invention.

FIG. 4 is a schematic diagram of an illumination system according to another embodiment of the invention. Referring to FIG. 4, an illumination system 100B in the present embodiment is similar to the illumination system 100 shown in FIG. 2. A difference between the two is that, in the present embodiment, there are two light source devices 110 and two polarization elements 130. The two light source devices 110 are placed perpendicular to each other, and the two polarization elements 130 are disposed on transmission paths of a first beam L1 and a first compensation beam L4 in the two light source devices 110, respectively, as shown in FIG. 4. In addition, a light guide device 140A includes a first light splitting element 144A, a second light splitting element 144B, and a semi-reflecting element 146. The first light splitting element 144A is disposed on transmission paths of a second beam L2 and a third beam L3 emitted by the light source device 110 shown above in FIG. 4 and on the transmission paths of the first beam L1 and the first compensation beam L4 emitted by the light source device 110 shown on the right in FIG. 4. The first light splitting element 144 is, for example, a dichroic mirror with red reflection (DMR) configured to reflect the first beam L1 and the first compensation beam L4 and allow the second beam L2 and the third beam L3 to pass. The second light splitting element 144B is disposed on the transmission paths of the first beam L1 and the first compensation beam L4 emitted by the light source device 110 shown above in FIG. 4 and on the transmission paths of the second beam L2 and the third beam L3 emitted by the light source device 110 shown on the right in FIG. 4. The second light splitting element 144B is, for example, a dichroic mirror with blue and green reflection (DMBG) configured to reflect the second beam L2 and the third beam L3 and allow the first beam L1 and the first compensation beam L4 to pass.

Therefore, when the first beam L1 and the first compensation beam L4 of the two light source devices 110 pass through the two polarization elements 130, respectively, P-polarized states of the two first beams L1 and the two first compensation beams L4 are all converted into S-polarized states through the polarization elements 130, so that the polarization states of the first beam L1 and the first compensation beam L4 are the same as the polarization states of the second beam L2 and the third beam L3. As such, the polarization states of all the beams may be unified to improve the color uniformity.

To sum up, the embodiments of the invention have at least one of the following advantages or effects. In the illumination system and the projection device provided in one or more embodiments of the invention, the light source device provides the first beam, the second beam, the third beam, and the first compensation beam, and the polarization element is disposed on the transmission paths of the first beam and the first compensation beam, so that the first beam and the first compensation beam pass through the polarization element to change the polarization states of the first beam and the first compensation beam to be the same as the polarization states of the second beam and the third beam. Therefore, the first beam, the second beam, the third beam, and the first compensation beam have the same polarization state when passing through the light homogenizing element. As such, the polarization states of all of the beams may be unified to improve the color uniformity.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the invention is intended to be dedicated to the public regardless of whether the element or component is explicitly recited in the following claims.

What is claimed is:

1. An illumination system, comprising: a light source device, a light homogenizing element, and a polarization element, wherein the light source device is configured to provide a first beam, a second beam, a third beam, and a first compensation beam, the first beam and the first compensation beam have a first polarization state, the second beam and the third beam have a second polarization state, and the first polarization state is different from the second polarization state, the light homogenizing element is disposed on transmission paths of the first beam, the second beam, the third beam, and the first compensation beam and is configured to convert the first beam, the second beam, the third beam, and the first compensation beam into an illumination beam, the polarization element is disposed on the transmission paths of the first beam and the first compensation beam and is located between the light source device and the light homogenizing element, and the first beam and the first compensation beam pass through the polarization element to change polarization states of the first beam and the first compensation beam to be the same as polarization states of the second beam and the third beam.

2. The illumination system according to claim 1, wherein the first beam, the second beam, the third beam, and the first compensation beam have a same polarization state or are not polarized when passing through the light homogenizing element.

3. The illumination system according to claim 1, wherein the second beam and the third beam do not pass through the polarization element.

4. The illumination system according to claim 1, wherein the second beam and the third beam pass through the polarization element and change the polarization states of the second beam and the third beam.

5. The illumination system according to claim 1, wherein the first beam, the second beam, the third beam, and the first compensation beam are transmitted and emitted in a same direction by the light source device.

6. The illumination system according to claim 1, wherein the polarization element comprises a half-wave plate, a quarter-wave plate, a depolarizer, or a twisted nematic liquid crystal device.

7. The illumination system according to claim 1, further comprising a light guide device configured to guide the first beam, the second beam, the third beam, and the first compensation beam.

8. The illumination system according to claim 7, wherein the polarization element is disposed between the light source device and the light guide device.

9. The illumination system according to claim 7, wherein the polarization element is disposed between the light guide device and the light homogenizing element.

10. The illumination system according to claim 1, wherein the illumination system further comprises a diffusion device configured to diffuse the second beam and the third beam.

11. A projection device, comprising: an illumination system, at least one light valve, and a projection lens, wherein the illumination system is configured to provide an illumination beam and comprises a light source device, a light homogenizing element, and a polarization element, wherein the light source device is configured to provide a first beam, a second beam, a third beam, and a first compensation beam, the first beam and the first compensation beam have a first polarization state, the second beam and the third beam have a second polarization state, and the first polarization state is different from the second polarization state, the light homogenizing element is disposed on transmission paths of the first beam, the second beam, the third beam, and the first compensation beam and configured to convert the first beam, the second beam, the third beam, and the first compensation beam into the illumination beam, and the polarization element is disposed on the transmission paths of the first beam and the first compensation beam and located between the light source device and the light homogenizing element, wherein the at least one light valve is disposed on a transmission path of the illumination beam and configured to convert the illumination beam into an image beam, and the projection lens is disposed on a transmission path of the image beam and configured to project the image beam out of the projection device, wherein the first beam and the first compensation beam pass through the polarization element to change polarization states of the first beam and the first compensation beam to be the same as polarization states of the second beam and the third beam.

12. The projection device according to claim 11, wherein the first beam, the second beam, the third beam, and the first compensation beam have a same polarization state or are not polarized when passing through the light homogenizing element.

13. The projection device according to claim 11, wherein the second beam and the third beam do not pass through the polarization element.

14. The projection device according to claim 11, wherein the second beam and the third beam pass through the polarization element and change the polarization states of the second beam and the third beam.

15. The projection device according to claim 11, wherein the first beam, the second beam, the third beam, and the first compensation beam are transmitted and emitted in a same direction by the light source device.

16. The projection device according to claim 11, wherein the polarization element comprises a half-wave plate, a quarter-wave plate, a depolarizer, or a twisted nematic liquid crystal device.

17. The projection device according to claim 11, wherein the illumination system further comprises a light guide device configured to guide the first beam, the second beam, the third beam, and the first compensation beam.

18. The projection device according to claim 17, wherein the polarization element is disposed between the light source device and the light guide device.

19. The projection device according to claim 17, wherein the polarization element is disposed between the light guide device and the light homogenizing element.

20. The projection device according to claim 11, wherein the illumination system further comprises a diffusion device configured to diffuse the second beam and the third beam.

* * * * *